(12) United States Patent
Yang et al.

(10) Patent No.: US 7,995,615 B2
(45) Date of Patent: Aug. 9, 2011

(54) APPARATUS AND METHOD FOR RECEIVING DATA IN A COMMUNICATION SYSTEM

(75) Inventors: Ha-Young Yang, Yongin-si (KR); Joon-Young Bae, Seoul (KR); Seung-Joo Maeng, Seongnam-si (KR)

(73) Assignee: Samsung Electronics Co., LLP, Suwon-si (KR)

( * ) Notice: Subject to any disclaimer, the term of this patent is extended or adjusted under 35 U.S.C. 154(b) by 680 days.

(21) Appl. No.: 11/959,745

(22) Filed: Dec. 19, 2007

(65) Prior Publication Data

US 2008/0151938 A1 Jun. 26, 2008

(30) Foreign Application Priority Data

Dec. 21, 2006 (KR) .......................... 10-2006-131789

(51) Int. Cl.
*H04J 13/00* (2011.01)
(52) U.S. Cl. ........ 370/479; 370/342; 370/208; 370/335; 375/150; 375/260; 455/69
(58) Field of Classification Search .................. 370/389, 370/479, 204–210, 335, 342; 375/150, 261, 375/377; 455/67, 69
See application file for complete search history.

(56) References Cited

U.S. PATENT DOCUMENTS

| 5,561,690 | A * | 10/1996 | Park .............................. 375/340 |
| 6,424,690 | B1 * | 7/2002 | Kay et al. ...................... 375/377 |
| 6,735,256 | B1 * | 5/2004 | Toshimitsu ................... 375/260 |
| 2003/0123383 | A1 * | 7/2003 | Korobkov et al. ............. 370/208 |
| 2005/0232138 | A1 | 10/2005 | Byun et al. |
| 2005/0286402 | A1 * | 12/2005 | Byun et al. .................... 370/203 |
| 2006/0209109 | A1 * | 9/2006 | Arazaki ......................... 347/12 |
| 2007/0070967 | A1 * | 3/2007 | Yang et al. .................... 370/342 |
| 2007/0071075 | A1 * | 3/2007 | Yang et al. .................... 375/150 |

FOREIGN PATENT DOCUMENTS

EP 1603266 A2 * 12/2005
KR 10-2006-0045660 A 5/2006
* cited by examiner

*Primary Examiner* — Dang T Ton
*Assistant Examiner* — Mandish Randhawa
(74) *Attorney, Agent, or Firm* — Jefferson IP Law, LLP

(57) ABSTRACT

An apparatus and method for receiving data in a communication system are provided. The method includes identifying first codewords, which have been used in transmission of data by a transmitter, in the data received from the transmitter, setting third codewords by adding second codewords to the identified first codewords, calculating correlation values of orthogonal vectors corresponding to the third codewords and detecting information included in the data based on the calculated correlation values. Accordingly, feedback information may be better received and detected.

16 Claims, 7 Drawing Sheets

| 1 BIT PAYLOAD | VECTOR INDEX [A0, A1, A2] |
|---|---|
| 0 | 0, 0, 0 |
| 1 | 4, 7, 2 |

FIG.4

| VECTOR INDEX | SUB-CARRIER ORTHOGONAL MODULATION SYMBOL<br>SUB-CARRIER (0) SUB-CARRIER (1) ⋯ SUB-CARRIER (7) |
|---|---|
| 0 | P0, P1, P2, P3, P0, P1, P2, P3 |
| 2 | P0, P0, P1, P1, P2, P2, P3, P3 |
| 4 | P0, P0, P0, P0, P0, P0, P0, P0 |
| 7 | P0, P2, P2, P0, P2, P0, P0, P2 |

FIG.5

| VECTOR INDEX | SUB-CARRIER ORTHOGONAL MODULATION SYMBOL SUB-CARRIER (0) SUB-CARRIER (1) ⋯ SUB-CARRIER (7) |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

FIG.6

| CODEWORDS SET | | VECTOR INDEX [A0, A1, A2] | | |
|---|---|---|---|---|
| 1 BIT PAYLOAD | 0 | 0 | 0 | 0 |
| | 1 | 4 | 7 | 2 |
| EXTRA CODEWORDS SETS | 2 | 1 | 1 | 1 |
| | 3 | 2 | 2 | 3 |
| | 4 | 3 | 3 | 4 |
| | 5 | 5 | 4 | 5 |
| | 6 | 6 | 5 | 6 |
| | 7 | 7 | 6 | 7 |

FIG.7

APPARATUS AND METHOD FOR RECEIVING DATA IN A COMMUNICATION SYSTEM

PRIORITY

This application claims the benefit under 35 U.S.C. §119 (a) of a Korean patent application filed in the Korean Industrial Property Office on Dec. 21, 2006 and assigned Serial No. 2006-131789, the entire disclosure of which is incorporated herein by reference.

BACKGROUND OF THE INVENTION

1. Field of the Invention

The present invention relates to a communication system. More particularly, the present invention relates to an apparatus and method for receiving data in an uplink (UL) of a Broadband Wireless Access (BWA) communication system.

2. Description of the Related Art

In the next generation communication systems, active research is underway with the goal of providing users with high-speed services having various Qualities of Services (QoSs). Active research is especially underway with the goal of guaranteeing mobility and QoS for Broadband Wireless Access (BWA) communication systems, such as a Wireless Local Area Network (WLAN) system and a Wireless Metropolitan Area Network (WMAN) system. Representatives of such next generation communication systems include an Institute of Electrical and Electronics Engineers (IEEE) 802.16a/d communication system and an IEEE 802.16e communication system.

The IEEE 802.16a/d communication system and the IEEE 802.16e communication system, which are BWA communication systems, employ an Orthogonal Frequency Division Multiplexing (OFDM)/Orthogonal Frequency Division Multiple Access (OFDMA) scheme in order to support a broadband transmission network for a physical channel of the WMAN system. The IEEE 802.16a/d communication system considers only a single cell structure with a state in which a current Subscriber Station (SS) is stationary, without considering mobility of the SS at all. In contrast, the IEEE 802.16e communication system considers mobility of the SS in addition to considerations made by the IEEE 802.16a communication system. As used herein, an SS having mobility is called a Mobile Station (MS).

According to the OFDM/OFDMA scheme, sub-carriers within one OFDM symbol are divided so as to be used by multiple users (i.e. multiple MSs). A communication system based on the OFDM/OFDMA scheme includes separate physical channels for transmitting control information. Uplink fast feedback information, which is a type of control information as described above, includes Signal to Noise Ratio (SNR), differential SNR of each band, fast Multiple Input Multiple Output (MIMO) feedback, mode selection feedback, etc. Further, the uplink control information of the communication system, that is, feedback information transmitted from each of the MSs to a Base Station (BS) that is providing communication service to the MS, includes Channel Quality Information (CQI) between the MS and the BS and information of Acknowledgement (ACK)/Non-Acknowledgement (NACK) in response to data transmitted by the BS. Specifically, the feedback information includes ACK when the MS has successfully received data transmitted from the BS to the MS, and includes NACK when the MS has failed to receive the data. That is, the MS feeds back an ACK message to the BS when it has successfully received data transmitted from the BS, and feeds back a NACK message to the BS when it has failed to receive the data.

In such a communication system, the quantity of the uplink ACK information is low in consideration of the entire communication service. In other words, the data transmitted from the MS to the BS does not include a large quantity of ACK information. For example, the data includes only one bit of uplink ACK information. And although the quantity of uplink ACK information is relatively small, it is very important in management of a communication system, and requires a high reliability in transmission thereof. However, in order to reduce the overhead ratio, a physical channel for transmission of the uplink ACK information is typically not allocated a large quantity of frequency-time resources. Therefore, regarding the physical channel used for transmitting the uplink ACK information, it may be advantageous to use a transmission scheme different from a scheme for transmitting a large quantity of information.

In general, in order to transmit uplink control information, the communication system uses a method of combining binary channel coding with coherent modulation or differential modulation.

However, when the uplink ACK channel is transmitted by using a small quantity of frequency-time resources according to the above-mentioned method, the probability of error increases and the stability of the communication system decreases. In contrast to the case in which there are sufficient pilot tones for transmission of available uplink traffic areas or downlink areas, the pilot tones for transmission of uplink ACK information may become insufficient. Therefore, the channel estimation performance decreases and the performance of the coherent modulation/demodulation scheme also decreases. At this time, if the number of pilot tones is increased in consideration of only the channel estimation performance, the number of data tones may become insufficient. Further, separation of the binary channel code and the modulation may decrease the optimized performance. Moreover, if a large quantity of frequency-time resources are used in transmitting uplink ACK information in order to enhance stability, the overhead ratio increases and the throughput of the communication system decreases.

Therefore, in order to achieve reliable and effective data transmission/reception in a communication system, a scheme capable of enabling a BS to detect exact uplink ACK/NACK information is necessary. In other words, in a communication system, when data to be transmitted to an MS occurs, the BS performs scheduling for transmission of the data, and then transmits the data to the MS through a downlink channel based on the scheduling. Then, as described above, the MS transmits feedback information including the ACK information to the BS in response to the data transmitted from the BS, and the BS having received the feedback information determines whether to retransmit the data in accordance with the ACK information. At this time, in the case of retransmitting the data, the BS again performs scheduling for the data retransmission and then retransmits the data. In this process, in order to enhance the data rate, throughput of the data and the resource use efficiency, a scheme for receiving and detecting the feedback information of the MS, for example the ACK information, is necessary.

SUMMARY OF THE INVENTION

An aspect of the present invention is to address the above-mentioned problems and/or disadvantages and to provide at least the advantages described below. Accordingly, an aspect of the present invention is to provide an apparatus and method for receiving data in a communication system.

It is another aspect of the present invention is to provide an apparatus and method for receiving feedback information in a communication system.

It is another aspect of the present invention is to provide an apparatus and method for receiving uplink fast feedback information in a communication system.

It is another aspect of the present invention is to provide an apparatus and method for receiving ACK information for improving a data rate, a throughput of data and resource use efficiency in a communication system.

In accordance with an aspect of the present invention, a method for data reception in a communication system is provided. The method includes identifying first codewords, which have been used in transmission of data by a transmitter, in the data received from the transmitter, setting third codewords by adding second codewords to the identified first codewords, calculating correlation values of orthogonal vectors corresponding to the third codewords and detecting information included in the data based on the calculated correlation values.

In accordance with another aspect of the present invention, an apparatus for data reception in a communication system is provided The apparatus includes a receiver for identifying first codewords, which have been used in transmission of data by a transmitter, in the data received from the transmitter, for setting third codewords by adding second codewords to the identified first codewords, for calculating correlation values of orthogonal vectors corresponding to the third codewords, and for detecting information included in the data based on the calculated correlation values.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIG. 4 illustrates codewords to be used for orthogonal modulation by a transmitter in a communication system according to an exemplary embodiment of the present invention;

FIG. 5 illustrates orthogonal vectors and orthogonal modulation symbols to be used in orthogonal modulation for transmission of uplink ACK information in a communication system according to an exemplary embodiment of the present invention;

FIG. 6 illustrates orthogonal vectors in orthogonal modulation for transmission of uplink fast ACK information in a communication system according to an exemplary embodiment of the present invention;

FIG. 7 illustrates codewords to be used in orthogonal demodulation by the receiver in a communication system according to an exemplary embodiment of the present invention

Throughout the drawings, it should be noted that like reference numbers are used to depict the same or similar elements, features and structures.

DETAILED DESCRIPTION OF EXEMPLARY EMBODIMENTS

Figure 1:
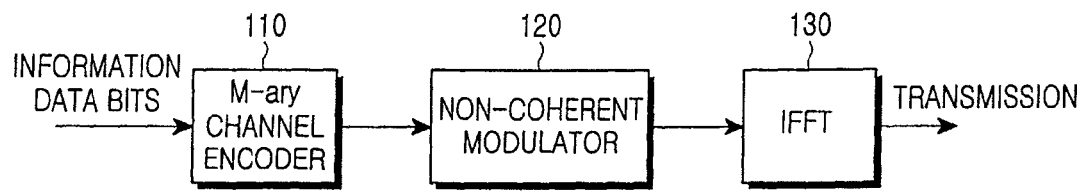
FIG. 1 is a schematic block diagram illustrating a structure of a transmitter in a communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention proposes an apparatus and method for receiving data in an Institute of Electrical and Electronics Engineers (IEEE) 802.16 communication system, which is a Broadband Wireless Access (BWA) communication system. The following descriptions of exemplary embodiments of the present invention are based on an IEEE 802.16 communication system employing an Orthogonal Frequency Division Multiplexing (OFDM)/Orthogonal Frequency Division Multiple Access (OFDMA) scheme. However, this is merely for convenience of description. It should be understood that the apparatus and method for receiving data illustrated in the following exemplary embodiments of the present invention can be applied to other communication systems.

Further, the following exemplary embodiments of the present invention illustrate an apparatus and method for receiving data by a transmitter, for example, a Base Station (BS), from a receiver, for example a Mobile Station (MS), that receives a communication service provided by the transmitter. Also, the illustrated exemplary embodiments of the present invention propose an apparatus and method for data reception, by which a BS can receive feedback information, for example, uplink fast feedback information as uplink control information, from an MS. As used herein, the feedback information includes Channel Quality Information (CQI) between the MS and the BS and information of Acknowledgement (ACK)/Non-Acknowledgement (NACK) in response to the data transmitted by the BS. Specifically, the feedback information includes ACK when the MS has successfully received the data transmitted from the BS to the MS, and includes NACK when the MS has failed to receive the data. That is, the MS feeds back an ACK message to the BS when it has successfully received the data transmitted from the BS, and feeds back a NACK message to the BS when it has failed to receive the data.

Here, in a communication system according to an exemplary embodiment of the present invention, when a BS receives an ACK signal fed back from the MS, the BS sets codewords in order to detect the ACK information and then detects the ACK information by using the set codewords during the decoding. At this time, the BS sets third codewords by adding second codewords to the codewords (i.e. the first codewords) used for transmission of the ACK information by the MS, calculates sums of squares of absolute values of correlation values of orthogonal vectors corresponding to the third codewords, and then calculates a maximum value of the first codewords and an average value of the calculated sums of the squares, that is, an average value of the third codewords. Thereafter, the BS calculates a difference between the calculated maximum value and the calculated average value, and then detects ACK information in accordance with the calculated difference.

FIG. 1 is a schematic block diagram illustrating a structure of a transmitter in a communication system according to an exemplary embodiment of the present invention.

Referring to FIG. 1, the transmitter includes a channel encoder 110 for encoding data bits of uplink fast feedback information, a non-coherent modulator 120 for modulating the information data bits according to a non-coherent scheme, and an Inverse Fast Fourier Transform (IFFT) unit 130 for performing IFFT on a signal to be transmitted to a receiver.

When a data bit of uplink fast feedback information to be transmitted is presented at the channel encoder 110, the channel encoder 110 receives the information data bit and outputs codewords corresponding to the information data bit to the non-coherent modulator 120. Here, according to the input bit, the channel encoder 110 may be a binary channel encoder or an M-ary channel encoder using M-ary block codes.

The non-coherent modulator 120 modulates a transmission symbol corresponding to the codewords input from the channel encoder 110 according to a non-coherent modulation scheme, and then outputs the modulated transmission symbol to the IFFT unit 130. Here, the non-coherent modulator 120 may use a preset modulation scheme, for example, an orthogonal modulation scheme. Then, the IFFT unit 130 receives the transmission symbol from the non-coherent modulator 120, performs IFFT on the received transmission symbol and transmits the IFFT'd symbol.

Figure 2:
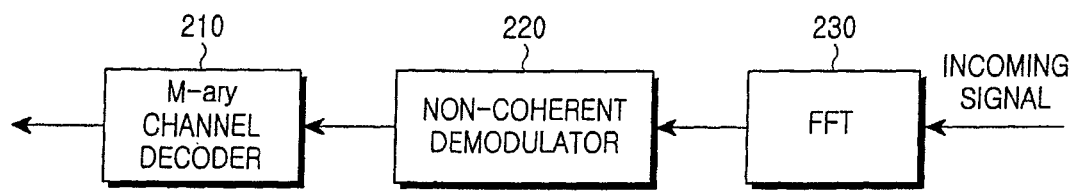
FIG. 2 is a schematic block diagram illustrating a structure of a receiver in a communication system according to an exemplary embodiment of the present invention.

FIG. 2 is a schematic block diagram illustrating a structure of a receiver in a communication system according to an exemplary embodiment of the present invention.

Referring to FIG. 2, the receiver includes a Fast Fourier Transform (FFT) unit 230 for converting a time domain incoming signal (e.g. an ACK signal) to a frequency domain incoming signal through FFT, a non-coherent demodulator 220 for demodulating the frequency domain incoming signal and a channel decoder 210 for decoding a data bit of uplink fast feedback information in the demodulated incoming symbol.

Upon receiving an incoming signal, the FFT unit 230 performs FFT on the incoming signal and outputs the incoming symbol to the non-coherent demodulator 220.

The non-coherent demodulator 220 receives the incoming symbol from the FFT unit 230, demodulates a soft decision value of the received symbol according to a non-coherent demodulation scheme and outputs the demodulated soft decision value to the channel decoder 210.

The channel decoder 210 receives the soft decision value from the non-coherent demodulator 220, determines what codewords have been transmitted, and outputs a data bit corresponding to a result of the determination. Here, according to the input bit, the channel decoder 210 may be a binary channel decoder or an M-ary channel decoder.

The following description of the transmission of uplink fast feedback information according to an exemplary embodiment of the present invention is based on an example in which three groups of 4×3 sub-carriers on the frequency-time axis are allocated in an uplink of an OFDM/OFDMA communication system. Here, the sub-carriers in each group may be grouped in another form, for example, in a form of 3×3.

Figure 3:
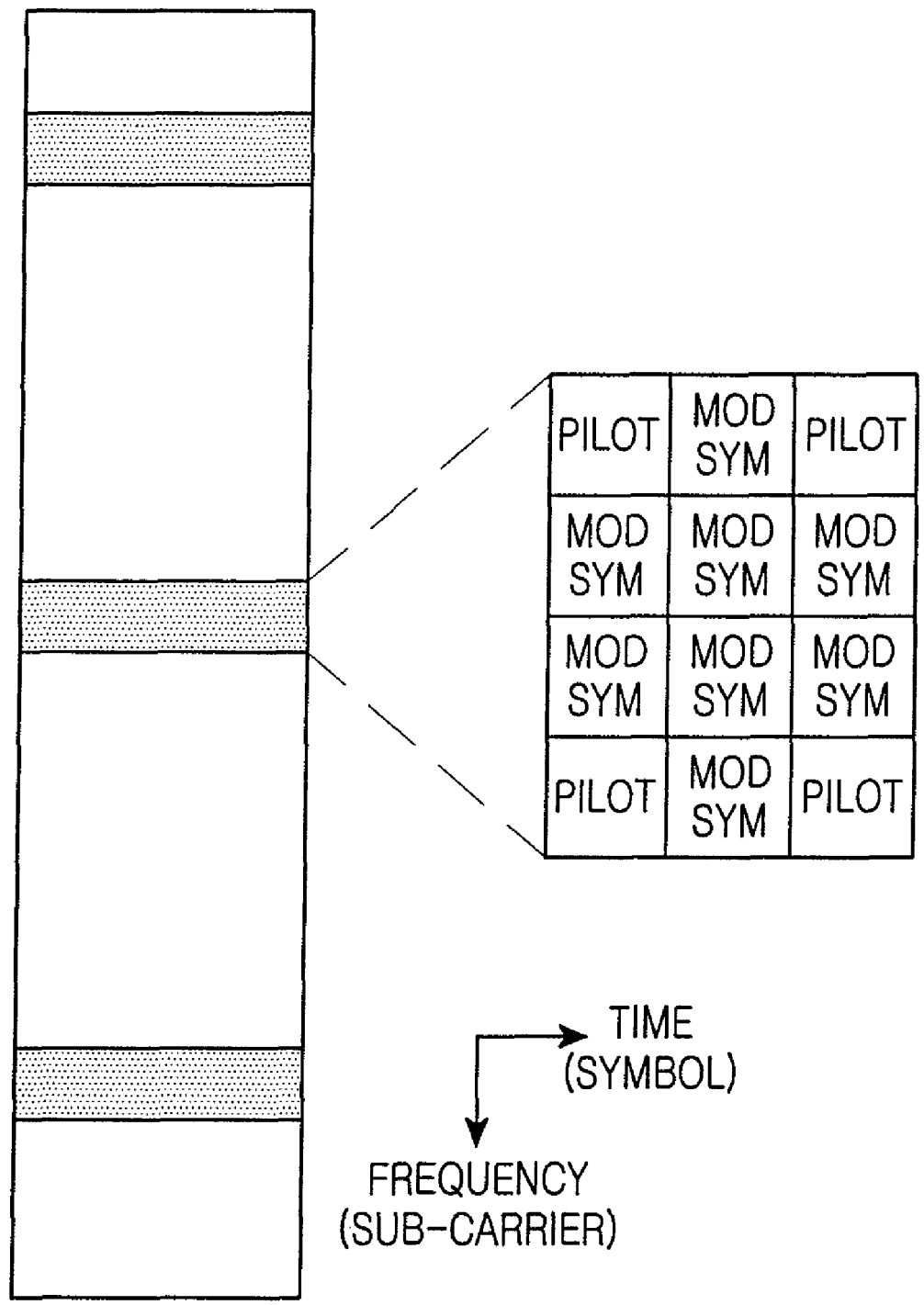
FIG. 3 illustrates an example of frequency-time resources allocated for transmission of uplink ACK information in a communication system according to an exemplary embodiment of the present invention.

FIG. 3 illustrates an example of frequency-time resources allocated for transmission of uplink ACK information in a communication system according to an exemplary embodiment of the present invention. In this example, the information data for the uplink ACK information has a size of one bit.

Referring to FIG. 3, the information data bit of the uplink ACK information to be transmitted to the receiver is input through the M-ary channel encoder to the non-coherent modulator as described above. Then, the non-coherent modulator modulates the transmission signal by using an orthogonal modulation scheme. At this time, the information data has a size of one bit that has a value of either "0" or "1," which refer to a success or failure of the transmission, respectively. Further, M has a value of 8 in the M-ary channel encoder, that is, an 8-ary channel encoder is used as the M-ary channel encoder. At this time, in the 8-ary channel encoder, the minimum Hamming distance between codewords has a maximum value for a given codeword length. The Hamming distance refers to the number of binary codes which have the same number of bits and have different bit values. When one bit of information data to be transmitted is given as described above, the transmitter transmits the information data for the uplink ACK information. At this time, the transmitter transmits eight modulation symbols through eight sub-carriers of the 4×3 sub-carrier group and transmits four pilot symbols through the remaining four sub-carriers.

When the receiver receives an incoming signal (e.g. ACK signal) from the transmitter, the receiver performs FFT on the incoming signal by the FFT unit 230. Thereafter, the non-coherent demodulator 220 of the receiver calculates squares of absolute values of correlation values for possible orthogonal vectors for each of the three groups of 4×3 sub-carriers. The channel decoder 210 of the receiver then calculates sums of the calculated squares of absolute values, sets a maximum value and a minimum value from among the calculated sums and compares a difference between the maximum value and the minimum value with a threshold, thereby determining whether to perform detection of ACK information. Here, the calculated sums of the squares of the absolute values may follow either the linear scale or the log scale. The difference between the maximum value and the minimum value can be defined by formula (1) below.

$$\max_n \left\{ \sum_{m=1}^{M} \left| \sum_{k=1}^{K} X^*_{n,m,k} Y_{m,k} \right|^2 \right\} - \min_n \left\{ \sum_{m=1}^{M} \left| \sum_{k=1}^{K} X^*_{n,m,k} Y_{m,k} \right|^2 \right\} \quad (1)$$

In formula (1), $Y_{m,k}$ refers to the $k^{th}$ incoming sub-carrier symbol of the $m^{th}$ sub-carrier group, $X_{n,m,k}$ refers to the $k^{th}$ sub-carrier symbol of the $m^{th}$ sub-carrier group corresponding to the $n^{th}$ possible codeword, n refers to a codeword index of a set {0,1}, m refers to a sub-carrier group index of a set {1,2,3}, and k refers to a sub-carrier symbol index of a set {1,2,3,4,5,6,7,8}.

Although the ACK information, which is uplink control information, that is, uplink fast feedback information, has a size of only one bit, the ACK information is very important in the management of a communication system. In order to transmit such ACK information, an orthogonal modulation scheme is used.

FIG. 4 illustrates codewords to be used for orthogonal modulation by a transmitter in a communication system according to an exemplary embodiment of the present invention. Specifically, in the example shown in FIG. 4, three 4×3 sub-carrier groups including 12 sub-carriers on frequency-time axes are allocated to an ACK channel, ACK vector indexes, which are a part of CQI codewords, are used for transmission of the ACK information, which is uplink control information, in order to reduce the complexity of implementation thereof, and a CQI modulation pattern is reused as the modulation pattern.

Referring to FIG. 4, tiles of the ACK vector indexes, that is, A0, A1, and A2, indicate the three 4×3 sub-carrier groups including 12 sub-carriers, respectively. The ACK codewords belong to a set of orthogonal vectors and are directly mapped to orthogonal sub-carriers. The orthogonal sub-carriers will be described later in detail with reference to FIG. 5. When the ACK bit (i.e. 1 bit payload) is "0," all the ACK vector indexes of the tiles A0, A1, and A2 are set to "0." When the ACK bit is "1," the ACK vector index of A0 is set to "4," the ACK vector index of A1 is set to "7," and the ACK vector index of A2 is set to "2." Here, the orthogonal vectors include Quadrature Phase Shift Keying (QPSK) modulation symbols.

FIG. 5 illustrates orthogonal vectors and orthogonal modulation symbols to be used in orthogonal modulation for transmission of uplink ACK information in a communication system according to an exemplary embodiment of the present invention.

Referring to FIG. 5, as described above, the orthogonal vectors include QPSK modulation symbols P0, P1, P2, and P3, which can be defined by formula (2) below.

$$P0 = \exp\left(j\frac{\pi}{4}\right)$$
$$P1 = \exp\left(j\frac{3\pi}{4}\right)$$
$$P2 = \exp\left(-j\frac{3\pi}{4}\right)$$
$$P3 = \exp\left(-j\frac{\pi}{4}\right)$$
(2)

Specifically, when one bit of information data (ACK bit) to be transmitted is given, the transmitter transmits the information data for the ACK by using formula (2). Here, the information data (i.e. the ACK bit) has a value of 0, and each of the tiles A0, A1, and A2 is set to have transmission symbol values of P0, P1, P2, P3, P0, P1, P2, P3, which correspond to the vector index 0. In contrast, when the ACK bit is 1, the transmission symbol values of A0 are set to P0, P0, P0, P0, P0, P0, P0, P0, which correspond to the vector index 4, and the transmission symbol values of A1 are set to P0, P2, P2, P0, P2, P0, P0, P2, which correspond to the vector index 7. Further, the transmission symbol values of A2 are set to P0, P0, P1, P1, P2, P2, P3, P3, which correspond to the vector index 2.

FIG. 6 illustrates orthogonal vectors in orthogonal modulation for transmission of uplink fast ACK information in a communication system according to an exemplary embodiment of the present invention.

Referring to FIG. 6, the orthogonal vectors P0, P1, P2, and P3 are QPSK modulation symbols, which can be defined by formula (2) above. Further, since the orthogonal vectors are used also in the CQI, the CQI modulation pattern can be reused.

Eight sub-carriers in the 4×3 sub-carrier group including 12 sub-carriers transmit modulation symbols as shown in FIG. 6, and the remaining four sub-carriers transmit pilot symbols. At this time, the pilot symbols may be optionally selected. Further, the values of the transmitted modulation symbols are set by orthogonal vectors corresponding to the vector indexes as shown in FIG. 6.

More specifically, when one bit of information data (ACK bit) to be transmitted is given, the transmitter transmits the information data for the ACK by using formula (2). Here, the information data (i.e. the ACK bit) has a value of 0, and each of the tiles A0, A1, and A2 is set to have transmission symbol values of P0, P1, P2, P3, P0, P1, P2, P3, which correspond to the vector index 0. In contrast, when the ACK bit is 1, the transmission symbol values of A0 are set to P0, P0, P0, P0, P0, P0, P0, P0, which correspond to the vector index 4, and the transmission symbol values of A1 are set to P0, P2, P2, P0, P2, P0, P0, P2, which correspond to the vector index 7. Further, the transmission symbol values of A2 are set to P0, P0, P1, P1, P2, P2, P3, P3, which correspond to the vector index 2.

When the receiver has received an incoming signal (i.e. ACK signal) from the transmitter, the FFT unit of the receiver performs FFT on the incoming signal. Then, the non-coherent demodulator of the receiver calculates squares of correlation values for two possible codewords (i.e. "000" and "472") as shown in FIG. 4 for each of the three 4×3 sub-carrier groups including 12 sub-carriers. Thereafter, as shown in formula (1), the channel decoder of the receiver calculates sums of squares of absolute values of correlation values of orthogonal vectors corresponding to two codewords, sets the largest value from among the calculated sums as a maximum value, and sets a soft decision value for the remaining codewords as a minimum value.

Thereafter, the channel decoder compares a difference between the maximum value and the minimum value with a threshold. As a result of the comparison, when the difference is larger than the threshold, the channel decoder determines the information data bit corresponding to the codeword of the maximum value as a transmitted signal, and performs detection of the ACK information. In contrast, when the difference is smaller than the threshold, the channel decoder does not determine the information data bit corresponding to the codeword of the maximum value as the transmitted signal, and does not perform detection of the ACK information. At this time, when the receiver determines whether to perform detection of ACK information by using correlation values for the two possible codewords as shown in FIG. 4, the exactness of the determination is degraded. Therefore, in a communication system according to an exemplary embodiment of the present invention, the receiver determines, by using codewords as shown in FIG. 7, whether to perform detection of ACK information.

FIG. 7 illustrates codewords to be used in orthogonal demodulation by the receiver in a communication system according to an exemplary embodiment of the present invention. Specifically, in the case where three 4×3 sub-carrier groups including 12 sub-carriers on frequency-time axes are allocated to an ACK channel as described above, when the transmitter transmits uplink ACK information orthogonally modulated by using the codewords as shown in FIG. 4, the receiver demodulates the uplink ACK information received from the transmitter by using the codewords as shown in FIG. 7.

Referring to FIG. 7, tiles A0, A1, and A2 of the ACK vector indexes indicate three 4×3 sub-carrier groups including 12 sub-carriers. The codewords to be used in demodulation of uplink ACK by the receiver include the first codewords, which are codewords (1 bit payload) set to be used in modulation by the transmitter as shown in FIG. 4, and the third codewords obtained by adding the second codewords (which are extra codewords sets) to the first codewords. In other words, the third codewords, which are codewords to be used by the receiver, include the first codewords, wherein the ACK vector indexes of tiles A0, A1, and A2 are set to "000" when the ACK bit (i.e. 1 bit payload), which is a codeword set to be used in modulation by the transmitter, is "0," and are set to "472" when the ACK bit is "1," and the second codewords wherein the ACK vector indexes of A0, A1, and A2 are set to "111" when the extra codewords set, which is an additionally set codeword, is "2," are set to "223" when the extra codewords set is "3," are set to "334" when the extra codewords set is "4," are set to "545" when the extra codewords set is "5," are set to "656" when the extra codewords set is "6," and are set to "767" when the extra codewords set is "7."

When one bit of information data to be transmitted to the receiver is given, the transmitter sets a codeword to be used in modulation as described above with reference to FIG. 4, sets orthogonal vectors corresponding to tiles A0, A1, and A2 for the ACK bits, which are information data to be transmitted as described above with reference to FIG. 5, and then transmits uplink ACK information.

The receiver receives an incoming signal (e.g. ACK signal) transmitted from the transmitter. Upon receipt of the incoming signal, the FFT unit of the receiver performs an FFT. Thereafter, the non-coherent demodulator of the receiver calculates squares of absolute values of correlation values for eight possible orthogonal vectors for each of the three 4×3 sub-carrier groups including 12 sub-carriers, as shown in FIG. 6. The correlation values are obtained by correlating modulation symbols included in the eight received sub-carriers with symbols corresponding to the orthogonal vectors. At this time, as shown in FIG. 5, the transmitter uses only the four types of orthogonal vectors having vector indexes of "0," "2," "4," and "7" related to the codewords "0" and "1." Therefore, the receiver can obtain the correlation values by correlating all orthogonal vectors other than the orthogonal vectors allocated to transmissible codewords by using the unused orthogonal vectors, that is, the orthogonal vectors having vector indexes of "1," "3," "5," and "6." Therefore, it is possible to calculate a dispersion average for noise elements other than the signal elements.

Thereafter, the receiver calculates sums of squares of absolute values of correlation values of orthogonal vectors corresponding to the eight third codewords, which includes the first codewords (1 bit payload) set to be used for modulation by the transmitter and the second codewords (extra codewords sets) set in addition to the first codewords, as shown in FIG. 7. Specifically, the channel decoder of the receiver calculates sums of squares of absolute values of correlation values of orthogonal vectors corresponding to the eight third codewords, which includes the first codewords "000" and "472" set for use by the transmitter and the second codewords "111," "223," "334," "545," "656," and "767" set in addition to the first codewords. Then, the receiver obtains a maximum value from among the codewords "000" and "472" set for use by the transmitter, that is, a maximum value from among the first codewords, and calculates an average value of the sums of the squares calculated for the third codewords. Then, the receiver can obtain the correlation values by correlating all orthogonal vectors other than the orthogonal vectors allocated to transmissible codewords, thereby obtaining a dispersion average for noise elements other than the signal elements.

Thereafter, the receiver calculates a difference between the maximum value and the minimum value, compares the difference with a threshold set based on the communication environment and the communication system, and then determines whether to perform detection of ACK information based on a result of the comparison. Here, the difference between the maximum value and the minimum value can be defined by formula (3) below.

$$\max_i \left\{ \sum_{m=1}^{M} \left[ \left| \sum_{k=1}^{K} X_{i,m,k}^* Y_{m,k} \right|^2 \right] \right\} - avrg_n \left\{ \sum_{m=1}^{M} \left[ \left| \sum_{k=1}^{K} X_{n,m,k}^* Y_{m,k} \right|^2 \right] \right\} \quad (3)$$

In formula (3), $$\max_i \left\{ \sum_{m=1}^{M} \left[ \left| \sum_{k=1}^{K} X_{i,m,k}^* Y_{m,k} \right|^2 \right] \right\}$$

refers to the maximum value from among the codewords "000" and "472" set for use by the transmitter, that is, the maximum value from among the first codewords, and $$avrg_n \left\{ \sum_{m=1}^{M} \left[ \left| \sum_{k=1}^{K} X_{n,m,k}^* Y_{m,k} \right|^2 \right] \right\}$$

refers to the average value of the sums of the squares calculated for the eight third codewords that include the codewords "000" and "472" set for use by the transmitter and the additionally set second codewords "111," "223," "334," "545," "656," and "767."

Here, the calculated sums of the squares of the absolute values may follow either the linear scale or the log scale. Further, the calculated average value of the sums of the squares also may follow either the linear scale or the log scale.

In formula (3), $Y_{m,k}$ refers to the $k^{th}$ incoming sub-carrier symbol of the $m^{th}$ sub-carrier group, $X_{n,m,k}$ refers to the $k^{th}$ sub-carrier symbol of the $m^{th}$ sub-carrier group corresponding to the $n^{th}$ possible codeword from among the eight codewords set for use in the receiver, $X_{i,m,k}$ refers to the $k^{th}$ sub-carrier symbol of the $m^{th}$ sub-carrier group corresponding to the $i^{th}$ possible codeword from among the two codewords set for use in the transmitter, n refers to a codeword index of a set $\{0 \sim N_{codeword}\}$ and has a value of 8 because 8 eight codewords are employed in the case of FIG. 7, i refers to a codeword index of the set $\{0,1\}$ arranged for use in transmission of ACK information by the transmitter, m refers to a sub-carrier group index of a set $\{1,2,3\}$, and k refers to a sub-carrier symbol index of a set $\{1,2,3,4,5,6,7,8\}$.

Figure 8:
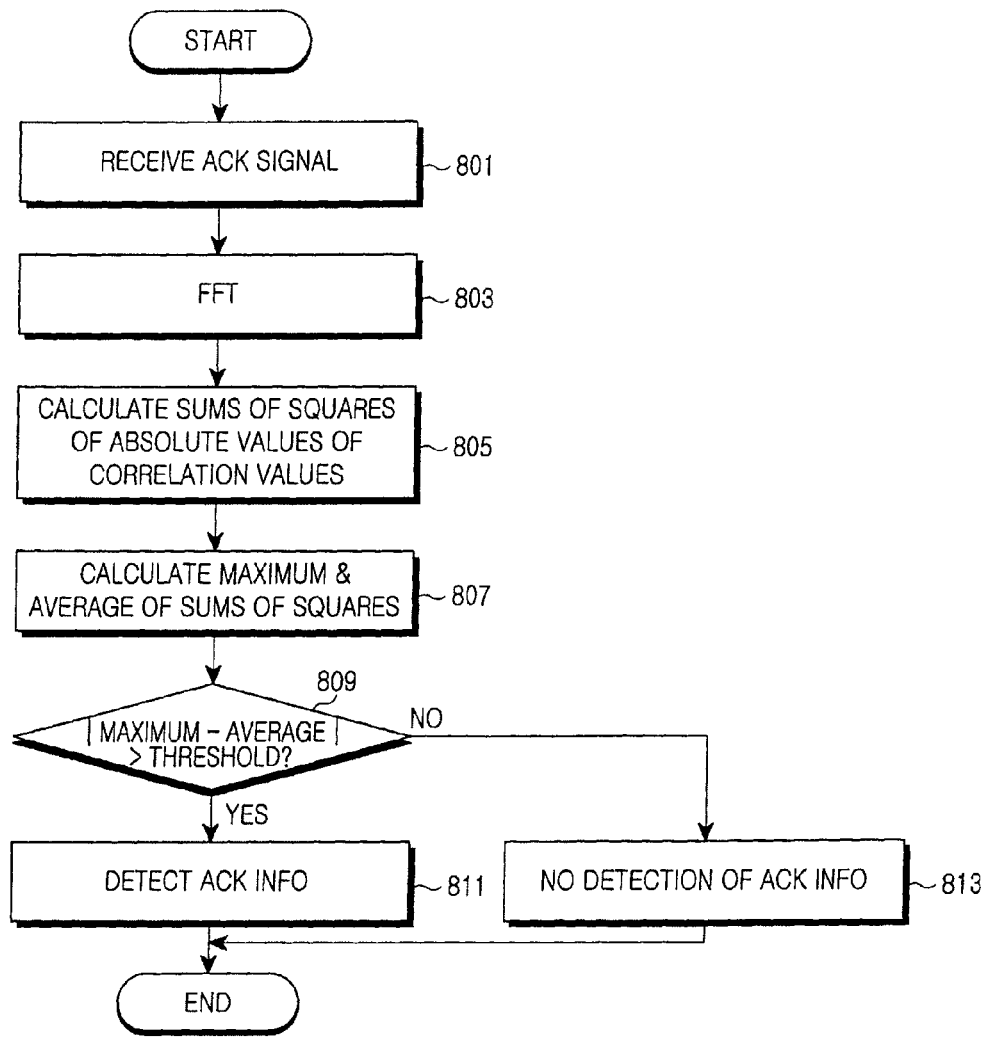
FIG. 8 is a flow diagram illustrating an operation of a receiver in a communication system according to an exemplary embodiment of the present invention.

FIG. 8 is a flow diagram illustrating an operation of a receiver in a communication system according to an exemplary embodiment of the present invention.

Referring to FIG. 8, the receiver receives an ACK signal including uplink ACK information from the transmitter in step 801, and the FFT unit of the receiver then performs FFT on the received signal in step 803. Then, in step 805, the receiver calculates sums of squares of absolute values of correlation values of orthogonal vectors corresponding to the eight third codewords, which include the first codewords (1 bit payload) set for use in modulation by the transmitter and the second codewords set in addition to the first codewords as shown in FIG. 7. Then, in step 807, the receiver calculates a maximum value of the first codewords (i.e. 1 bit payload) set for use in modulation by the transmitter and an average value of the calculated sums of squares for the third codewords.

Specifically, the receiver calculates sums of squares of absolute values of correlation values of orthogonal vectors corresponding to the eight third codewords, which includes the codewords "000" and "472" set for use by the transmitter and the additionally set codewords "111," "223," "334," "545," "656," and "767." Then, the receiver obtains a maximum value from among the first codewords "000" and "472"

set for use by the transmitter, and calculates an average value of the sums of the squares calculated for the eight third codewords set to be used by the receiver. Next, in step 809, the receiver calculates a difference between the maximum value and the average value as defined by formula (3), and compares the absolute value of the calculated difference with a threshold. As a result of the comparison, when the difference is larger than the threshold, the receiver proceeds to step 811, in which the receiver determines the information data bit corresponding to the codeword of the calculated maximum value as the transmitted signal and performs detection of the ACK information. In contrast, as a result of the comparison, when the difference is not larger than the threshold, the receiver proceeds to step 813, in which the receiver does not determine the information data bit corresponding to the codeword of the calculated maximum value as the transmitted signal, and does not perform detection of the ACK information.

Figure 9:
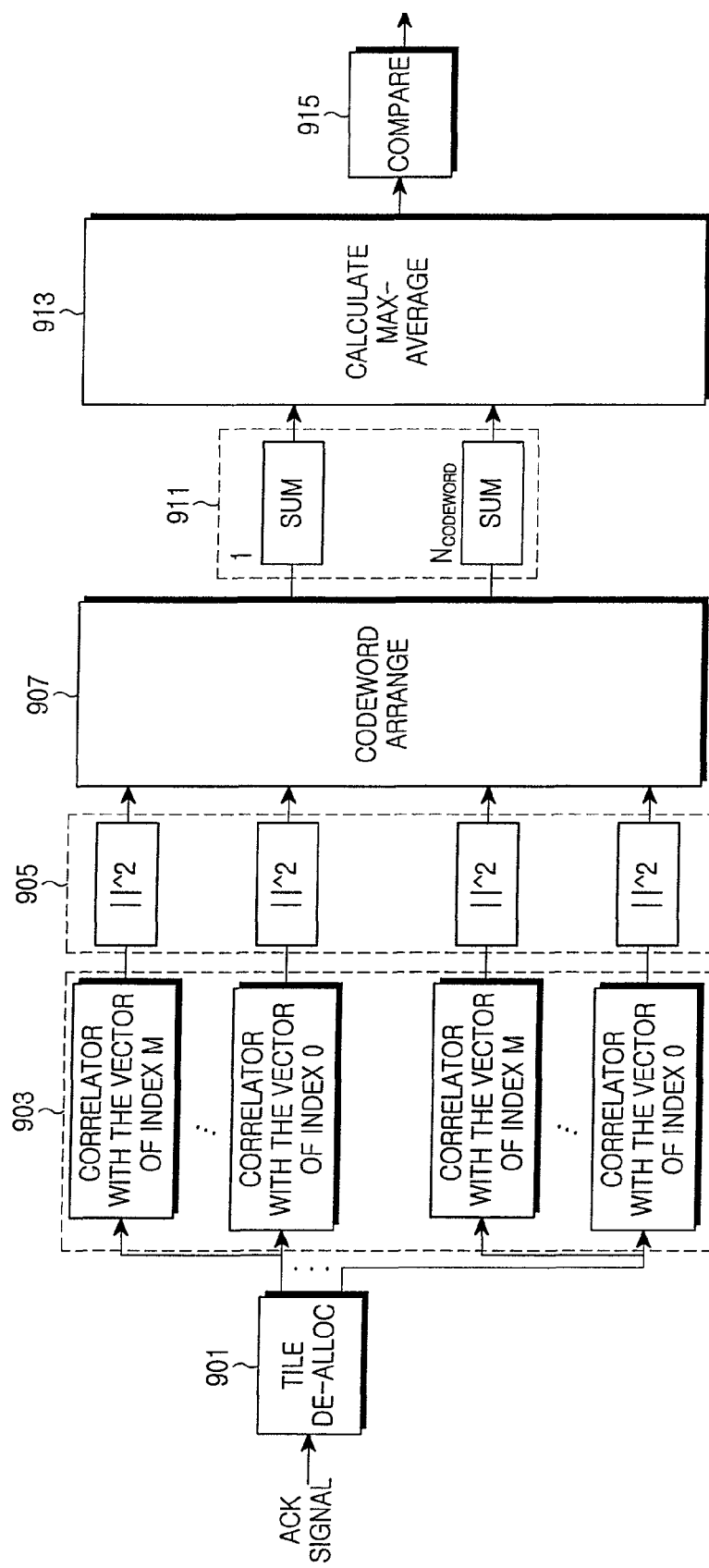
FIG. 9 is a block diagram illustrating the structure of an ACK information receiving unit of a receiver in a communication system according to an exemplary embodiment of the present invention.

FIG. 9 is a block diagram illustrating the structure of an ACK information receiving unit of a receiver in a communication system according to an exemplary embodiment of the present invention.

Referring to FIG. 9, the ACK information receiving unit of the receiver includes an identifying unit 901, a first calculation unit 903, a second calculation unit 905, an arranging unit 907, a third calculation unit 911, a fourth calculation unit 913, and a comparator 915. The identifying unit 901 identifies eight possible orthogonal vectors as shown in FIG. 6, that is, ACK vector indexes, for each of three 4×3 sub-carrier groups including 12 sub-carriers. The first calculation unit 903 calculates correlation values for the orthogonal vectors identified by the identifying unit 901. The second calculation unit 905 calculates squares of the absolute values of the correlation values calculated by the first calculation unit 903. The arranging unit 907 arranges eight third codewords, which include codewords corresponding to the squares of the absolute values calculated by the second calculation unit 905, that is, codewords (1 bit payload) set for use in modulation by the transmitter and additional codewords (the second codewords, that is, extra codewords sets) as shown in FIG. 7. The third calculation unit 911 calculates sums of squares of the absolute values of the correlation values of the orthogonal vectors corresponding to the eight codewords, which are the third codewords. The fourth calculation unit 913 calculates a maximum value from the first codewords (1 bit payload) set for use in modulation by the transmitter and an average value of the calculated sums of the squares for the third codewords, and calculates a difference between the maximum value and the average value as shown in formula (3). The comparator 915 compares the calculated difference with the threshold and determines whether to perform detection of ACK information.

As described above, the third calculator 911 calculates sums of squares of the absolute values of the correlation values of orthogonal vectors corresponding to all possible codewords, such as the eight codewords as shown in FIG. 7. After the third calculator 911 calculates sums of squares, the fourth calculator 913 calculates the difference as defined by formula (3), and the comparer 915 compares the difference with a threshold. When the difference is larger than the threshold, detection of the ACK information is performed. In contrast, when the difference is not larger than the threshold, detection of the ACK information is not performed.

In a communication system according to an exemplary embodiment of the present invention as described above, a transmitter can detect and receive exact uplink ACK information by using codewords used for transmission of uplink ACK information by the transmitter and added codewords. Therefore, the present invention can improve a data rate, a data throughput, and a resource use efficiency of the communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for data reception in a communication system, the method comprising:
   identifying first codewords in data received from a transmitter;
   setting third codewords by adding second codewords to the identified first codewords;
   calculating correlation values of orthogonal vectors corresponding to the third codewords; and
   detecting information included in the data based on the calculated correlation values,
   wherein the detecting of the information included in the data based on the calculated correlation values comprises:
   calculating sums of squares of absolute values of the calculated correlation values;
   calculating a maximum value of the first codewords; and
   calculating an average value of the calculated sums of the squares for the third codewords.

2. The method of claim 1, wherein the detecting of the information included in the data based on the calculated correlation values further comprises:
   calculating a difference between the maximum value and the average value;
   comparing the difference with a threshold; and
   detecting information included in the data based on a result of the comparison.

3. The method of claim 1, wherein the first codewords are codewords used for modulation of the data for transmission by the transmitter.

4. The method of claim 1, wherein the first codewords are included in a set of the orthogonal vectors and are mapped to sub-carriers for transmitting the data.

5. The method of claim 1, wherein the third codewords are codewords used in demodulation of the data received from the transmitter.

6. The method of claim 1, further comprising generating the second codewords in accordance with orthogonal vectors that are included in the set of the orthogonal vectors and have not been used in transmission of the data by the transmitter.

7. The method of claim 1, wherein the setting of the third codewords comprises setting the third codewords according to a pattern defined by

| Codewords set | | Vector Index [A0, A1, A2] | | |
|---|---|---|---|---|
| 1 bit payload | 0 | 0 | 0 | 0 |
|  | 1 | 4 | 7 | 2 |
| Extra codewords sets | 2 | 1 | 1 | 1 |
|  | 3 | 2 | 2 | 3 |
|  | 4 | 3 | 3 | 4 |
|  | 5 | 5 | 4 | 5 |
|  | 6 | 6 | 5 | 6 |
|  | 7 | 7 | 6 | 7 | wherein each of A0, A1, and A2 includes a predetermined number of sub-carriers.

8. The method of claim 1, wherein the information included in the data comprises Acknowledgement (ACK) information of the data in response to data transmitted to the transmitter.

9. An apparatus for data reception in a communication system, the apparatus comprising:
a receiver for identifying first codewords in data received from a transmitter, for setting third codewords by adding second codewords to the identified first codewords, for calculating correlation values of orthogonal vectors corresponding to the third codewords, and for detecting information included in the data based on the calculated correlation values,
wherein the receiver calculates sums of squares of absolute values of the calculated correlation values, calculates a maximum value of the first codewords and calculates an average value of the calculated sums of the squares for the third codewords.

10. The apparatus of claim 9, wherein the receiver calculates a difference between the maximum value and the average value, compares the difference with a threshold and detects information included in the data based on a result of the comparison.

11. The apparatus of claim 9, wherein the first codewords comprise codewords used in modulation of the data for transmission by the transmitter.

12. The apparatus of claim 9, wherein the first codewords are included in a set of the orthogonal vectors and are mapped to sub-carriers for transmitting the data.

13. The apparatus of claim 9, wherein the third codewords comprise codewords used in demodulation of the data received from the transmitter.

14. The apparatus of claim 9, wherein the second codewords are generated in accordance with orthogonal vectors those are included in the set of the orthogonal vectors and have not been used in transmission of the data by the transmitter.

15. The apparatus of claim 9, wherein the receiver sets the third codewords according to a pattern defined by

| Codewords set | Vector Index [A0, A1, A2] | | | |
|---|---|---|---|---|
| 1 bit payload | 0 | 0 | 0 | 0 |
|  | 1 | 4 | 7 | 2 |
| Extra | 2 | 1 | 1 | 1 |
| codewords | 3 | 2 | 2 | 3 |
| sets | 4 | 3 | 3 | 4 |
|  | 5 | 5 | 4 | 5 |
|  | 6 | 6 | 5 | 6 |
|  | 7 | 7 | 6 | 7 | wherein each of A0, A1, and A2 includes a predetermined number of sub-carriers.

16. The apparatus of claim 9, wherein the information included in the data comprises Acknowledgement (ACK) information of the data in response to data transmitted to the transmitter.

* * * * *